(12) United States Patent
Johnson

(10) Patent No.: US 6,599,609 B2
(45) Date of Patent: Jul. 29, 2003

(54) FLANGED HONEYCOMB CORE AND METHOD OF MAKING SAME

(76) Inventor: Jeffrey Don Johnson, 2626 S. Rock Rd., Wichita, KS (US) 67206

(*) Notice: Subject to any disclaimer, the term of this patent is extended or adjusted under 35 U.S.C. 154(b) by 0 days.

(21) Appl. No.: 09/732,457

(22) Filed: Dec. 8, 2000

(65) Prior Publication Data

US 2002/0071933 A1 Jun. 13, 2002

(51) Int. Cl.[7] .................................................. B32B 3/00
(52) U.S. Cl. ........................ 428/73; 428/116; 428/192; 428/121; 428/537.5; 428/593; 428/594; 156/197; 156/211; 156/212; 156/221; 156/227; 156/229; 156/250; 156/268; 156/290; 29/897.31; 29/897.32; 29/428
(58) Field of Search .......................... 428/116, 73, 117, 428/118, 12, 114, 192, 121, 537.5, 593, 594; 156/197, 60, 290, 61, 196, 198, 166, 211, 212, 221, 227, 229, 250, 268; 29/897, 428, 897.31, 897.32, 454, 592

(56) References Cited

U.S. PATENT DOCUMENTS

| | | |
|---|---|---|
| 1,784,368 A | 12/1930 | Loucks |
| 2,056,563 A | 10/1936 | Budd et al. |
| 2,076,811 A | 4/1937 | Ehlers |
| 2,220,596 A | 11/1940 | Bernhardt |
| 2,319,455 A | 5/1943 | Hardman et al. |
| 2,335,070 A * | 11/1943 | Luhrs |
| 2,441,476 A | 5/1948 | Ewald |
| 2,445,801 A | 7/1948 | Partiot |
| 2,481,046 A | 9/1949 | Scurlock |
| 2,540,400 A | 2/1951 | McHenry |
| 2,545,805 A | 3/1951 | Callender |
| 2,556,470 A | 6/1951 | Del Mar |
| 2,581,421 A | 1/1952 | Lombard et al. |
| 2,608,500 A | 8/1952 | Del Mar et al. |
| 2,608,502 A | 8/1952 | Merriman |
| 2,609,068 A | 9/1952 | Pajak |
| 2,609,314 A | 9/1952 | Engel et al. |
| 2,609,315 A | 9/1952 | Engel et al. |
| 2,644,777 A | 7/1953 | Havens |
| 2,654,686 A | 10/1953 | Hansen |
| 2,670,026 A | 2/1954 | Ungar |
| 2,670,314 A | 2/1954 | Ungar |
| 2,719,807 A * | 10/1955 | Steele |
| 2,720,948 A | 10/1955 | Pajak |
| 2,720,949 A | 10/1955 | Pajak |
| 2,728,479 A | 12/1955 | Wheeler |
| 2,738,297 A | 3/1956 | Pfistershammer |
| 3,137,604 A * | 6/1964 | Bosch |
| 3,493,450 A | 2/1970 | Judge, Jr. |
| 3,505,151 A | 4/1970 | Sheridan |
| 3,644,158 A | 2/1972 | Strumbos |
| 3,655,475 A | 4/1972 | Stelling, Jr. et al. |
| 3,655,476 A | 4/1972 | Siegel |
| 3,774,365 A * | 11/1973 | Cole, Jr. et al. |
| 4,045,268 A * | 8/1977 | Geschwender |
| 4,251,579 A * | 2/1981 | Lee et al. |
| 4,361,262 A | 11/1982 | Israeli |
| 4,483,478 A | 11/1984 | Schulz |
| 4,526,312 A | 7/1985 | Goss et al. |
| 4,530,197 A | 7/1985 | Rainville |
| 4,603,089 A | 7/1986 | Bampton |
| 4,642,436 A | 2/1987 | Rethwish et al. |
| 5,306,890 A | 4/1994 | Minamida et al. |
| 5,380,153 A | 1/1995 | Campbell |
| 5,437,936 A | 8/1995 | Johnson |

FOREIGN PATENT DOCUMENTS

GB    1398929    6/1975

* cited by examiner

*Primary Examiner*—Deborah Jones
*Assistant Examiner*—Wendy Boss
(74) *Attorney, Agent, or Firm*—Jones Day

(57) ABSTRACT

A stack assemblage of metallic, paper, or paper-like sheets or strips of material secured to one another to define a honeycomb core structure when the assemblage is expanded and flange tabs provided on the opposite edges of said stack. When the stack is expanded, the flange tabs can be deformed into flange orientation on the opposite edges of said stack. The method of fabricating the flange tabs and flanges on the assemblage and the expanded core structure.

20 Claims, 2 Drawing Sheets

FLANGED HONEYCOMB CORE AND METHOD OF MAKING SAME

This invention relates to a flanged honeycomb core structure and method of fabricating the same. A metallic honeycomb core structure which is laser-welded is shown in U.S. Pat. No. 5,437,936, the disclosures and teachings of which are incorporated herein by reference.

BACKGROUND OF THE INVENTION

A core structure of the type disclosed in U.S. Pat. No. 5,437,936 does not incorporate flanges but, rather, includes at the opposite extremities of the cells a very thin edge which is customarily secured, in the case of metallic foil honeycomb core, to the inner surface of facing sheets to define a structural panel. It is not necessary to braze the metallic honeycomb core structure to the facing sheets which is a complicated and expensive process and which materially increases the weight of the structural panel which results from such brazing. Most metallic honeycomb core is glued to the face sheets. The flanged core disclosed herein can be brazed, glued, resistance welded, or diffusion bonded to face sheets.

In paper or paper-like honeycomb core structures, the honeycomb core is glued to the inner surfaces of facing sheets which are customarily provided in the form of paper or paper substitutes or which may, on occasion, be fabricated from metallic foil.

Where the utilization of glue occurs, it adds materially to the weight of the resultant panel because the glue must be spread across the contacting surfaces of the honeycomb core and face sheets, thus adding to the amount and weight of glue in the resulting panel.

Although the teachings of the '936 patent are directed to the use of the laser weldment between adjacent sheets of metallic foil, the teachings of the present invention are relevant to both paper and paper substitutes and various types of flexible materials, including metallic foils of the character disclosed in the '936 patent since the formation of the flange tabs on paper or metallic structures can be accomplished by identical method steps.

OBJECTS AND ADVANTAGES OF THE INVENTION

It is, therefore, an object of my invention to provide an assemblage of flexible sheets or strips of material which are arranged in superimposed, stacked relationship with the assemblage having opposite longitudinal sides and upper and lower surfaces and the superimposed sheets having surfaces in engagement with and secured to each other at alternate locations to provide a honeycomb core configuration when the assemblage is expanded to assume said honeycomb core configuration, said sides having flange tabs thereupon.

A further object of my invention is the provision of such an assemblage in which securement means depending on the nature of the stacked material is provided. In the case of paper or paper-like materials, various types of glues, including resinous glues can be applied to the sheets of paper or paper-like material at the intervals determining the shape of the cells of the resultant honeycomb core. On the other hand, if the teachings of the '936 patent are followed, the foil sheets or strips can be secured to one another by the laser weldments disclosed in said patent.

An additional object of my invention is the provision on the opposite sides of said assemblage, whether fabricated from paper or paper-like materials or metallic foils, of flange tabs capable of being deformed into flanges on the honeycomb core structure after expansion of the assemblage to define said honeycomb core structure.

An additional object of my invention is the provision of an assemblage of the aforementioned type in which the flange tabs are defined by cutting or grooving the opposite sides to provide the desired shape and size of the flange tabs.

Another object of my invention is the provision of a method of fabricating the flange tabs which includes the grooving of the opposite sides of the assemblage.

A further object of my invention is the provision of a method of providing flanges upon the opposite sides of the aforesaid honeycomb core by deforming the flange tabs on said sides.

BRIEF DESCRIPTION OF THE DRAWINGS

Other objects and advantages of the invention will be apparent from the following specification and the accompanying drawings which are for the purposes of illustration only and in which.

PREFERRED EMBODIMENT OF THE INVENTION

Figure 1:
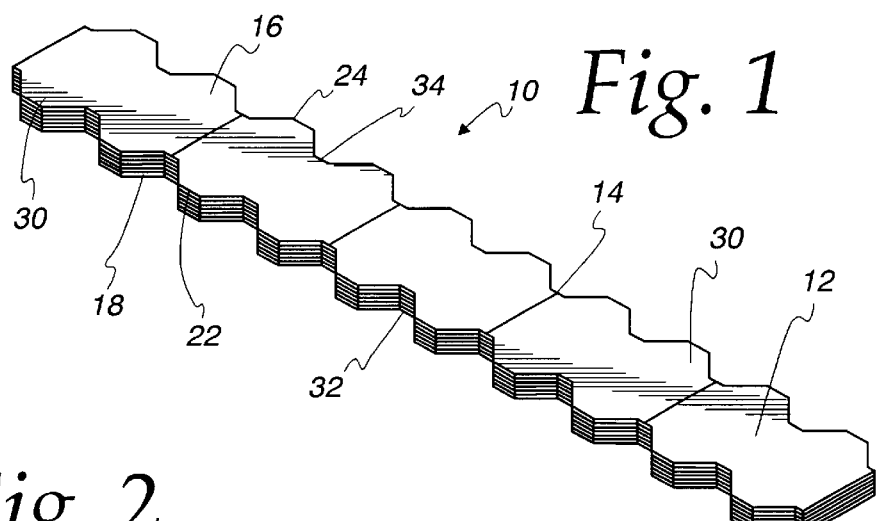
FIG. 1 is a view showing the assemblage after the flange tabs have been cut in the opposite sides thereof.
Figure 2:
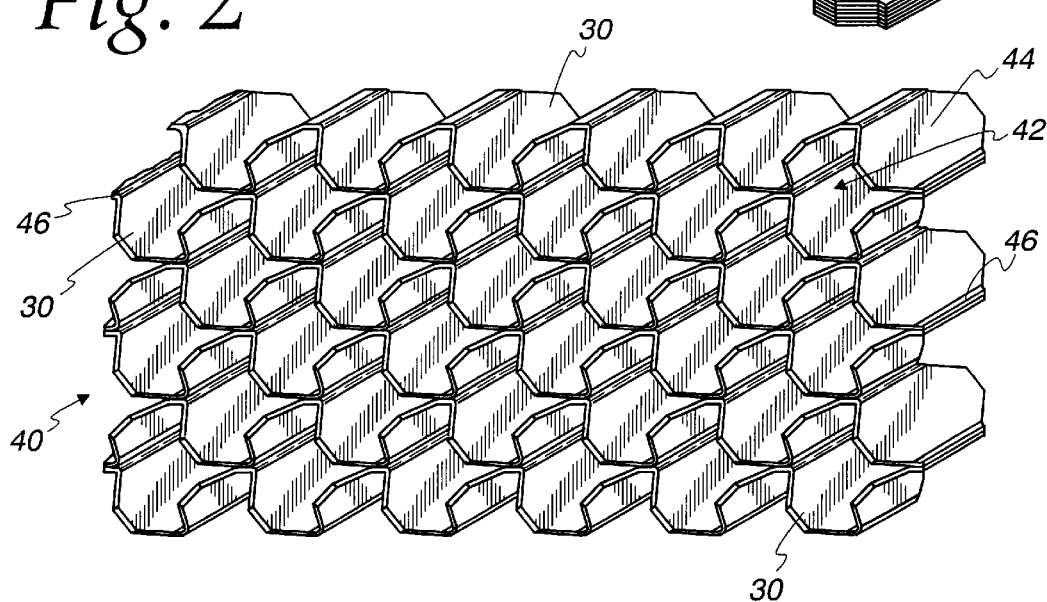
FIG. 2 is isometric view showing a portion of an expanded assemblage with the flange tabs extending laterally from the opposite surfaces of the honeycomb core.
Figure 3:
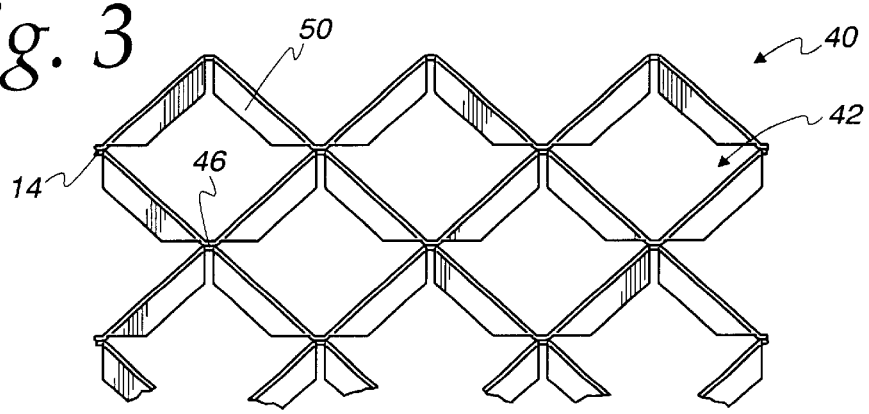
FIG. 3 is a fragmentary plan view showing the flange tabs after deformation into co-planarity with one another on opposite sides of the honeycomb core structure.

Referring to the drawings and, particularly, to FIGS. 1–3 thereof, I show an assemblage 10 of metallic foil sheets 12 which are secured in operative relationship by spaced laser weldments 14.

The assemblage 10 has upper and lower surfaces 16 and 18, respectively, and opposite sides 22 and 24.

The opposite sides 22 and 24 of the assemblage 10 include laterally-extending flange tabs 30, said flange tabs being defined by a series of grooves 32 and 34 on the opposite sides of said assemblage 10.

Although the showing in FIGS. 1–3 of the structure of the assemblage and the method of forming the same is directed to the laser weldment of metallic foils, it will be obvious to those skilled in the art that paper or paper-like products can be substituted for the metallic foils in the manufacture of the assemblage with the provision that the means of securement, in substitution for laser weldment of foils, will be various types of glues including heat-setting resinous glues.

In the case of the provision of the grooves 32 and 34 in the opposite sides 22 and 24 of the assemblage 10, the grooves can be formed by mechanical sawing or cutting; by the use of chemical methods of removing predetermined amounts and shapes of metallic materials; and by electrical removal of material. The shape of the grooves 32 and 34 determines the ultimate shape of the flange tabs 30.

In the case of assemblages such as the assemblage 10 wherein paper or paper-like products are utilized, the grooves can be cut by the utilization of brass or steel rule dies which are well-known expedients in the art of cutting paper.

The subsequent description of the formation of the flanged honeycomb core applies equally to the utilization of paper or paper-like materials and/or metallic foils. Obviously, any sheet or strip of material can be utilized as long as it is capable of maintaining the ultimate honeycomb core flanged configuration disclosed herein.

After the formation of the grooves 32 and 34, the top and bottom surfaces 16 and 18 are placed under tension to expand the assemblage 10 into the honeycomb configuration 40 shown in FIG. 2 of the drawings. The honeycomb cells 42, as best shown in FIGS. 2 and 3 of the drawings, are of square configuration and the grooving operation forms the walls 44 into a lozenge shape having the flange tabs 30 at the opposite extremities thereof. The strips 12 are secured to each other at nodal areas 46 which define the square shape of the cells 42.

It will be noted that the nodes 46 on successive strips 12 are staggered in respect to each other, as best shown in FIG. 3, to establish the square configuration of the cells 42. In the expanded honeycomb configuration 40, the flange tabs 30 extend laterally from the opposite sides of the core 40 and do not provide the flange surface for which they are intended. To accomplish the creation of the flanges 50, as best shown in FIG. 3, the flange tabs 30 must be bent into the flange configuration by any suitable means such as applying pressure individually to the flange tabs 30 or by utilizing mechanical means to accomplish the deformation of the flange tabs 30 into the flanges 50.

Figure 4:
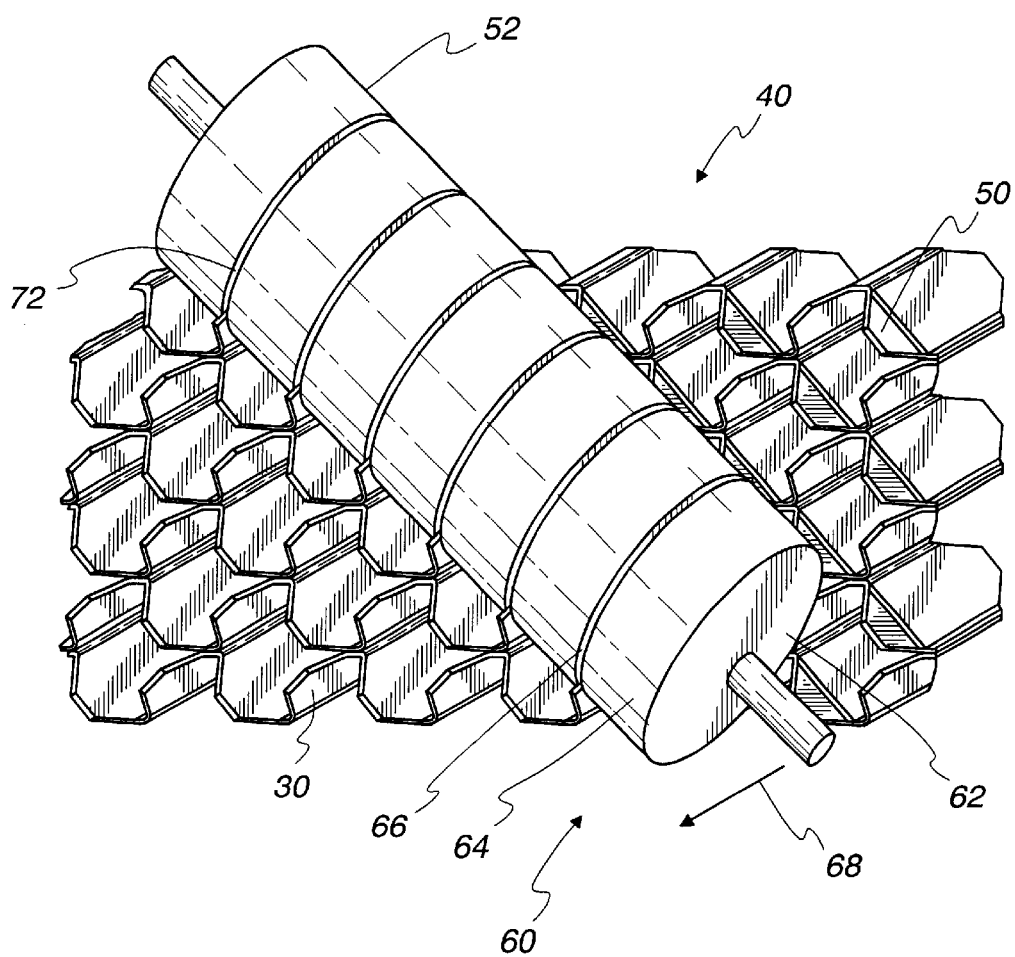
FIG. 4 is a showing of a forming roller which can be utilized in deforming the laterally-extending flange tabs into co-planarity with one another to provide flanges on the opposite surfaces of the honeycomb core structure.

A flanging device 60 is shown in FIG. 4 of the drawings as including a roller 62 traversible by any suitable means across the honeycomb core 40 and including deformation surfaces 64 and clearance means 66. The roller 62 is shown as moving in the direction of the arrow 68 with certain of the flange tabs 30 deformed into flanges 50 while other sets of flange tabs 30 are received in clearance grooves 72 in the roller 62 as the flanges 50 are being created in the direction in which the roller is rotated. After completion of the first set of flanges 50, the roller 62 can then be applied to the remaining undeformed flange tabs 30 to accomplish the deformation of the same.

As is well known to those skilled in the art, the provision of flanges on the opposite surfaces of the honeycomb core structures is of extreme importance because it provides an interface between the honeycomb structure and the inner surfaces of face sheets not achievable where the raw honeycomb absent flanges is utilized. By providing the flanges, a sufficient area for the application of glue, in the case of paper or paper products, or weldments, in the case of metallic structures, is achieved. The flanges materially enhance the performance of the resultant structural panel because of secure engagement of the respective honeycomb and face sheet surfaces.

Further, the panels are greatly reduced in weight because the use of brazing in metallic panels and excessive amounts of glue in paper or paper-like panels is obviated.

Although an embodiment of the flanged core and method of making the same has been disclosed hereinabove, it is not intended to limit the teachings of the invention to the specificity of the disclosure.

I claim:

1. In a honeycomb structure, the structure formed from an assemblage of sheets or strips of flexible material, said assemblage having opposite longitudinal sides, said sheets or strips being stacked together in contiguous relationship, said stacked sheets or strips of flexible material being secured to one another at staggered locations and then expanded to assume a honeycomb core structure, the improvement wherein said assemblage further comprises flange tabs on at least some of said longitudinal sides, said flange tabs providing substantially flat surfaces on flanges formed from said tab for securement of said honeycomb structure to a face sheet.

2. The honeycomb core structure of claim 1 in which said sheets or strips are fabricated from paper materials.

3. The honeycomb core structure of claim 2 in which said sheets of paper materials are secured to one another by glue.

4. The honeycomb core structure of claim 1 in which said sheets or strips are fabricated from metallic foils.

5. The honeycomb core structure of claim 4 in which said sheets or strips are secured to one another by series of weldments.

6. The honeycomb core structure of claim 5 wherein said weldments are laser weldments.

7. The honeycomb core structure of claim 1 in which said flange tabs are defined by a series of grooves in at least one longitudinal side of said assemblage.

8. The honeycomb core structure of claim 7 wherein said grooves are in both longitudinal sides, and in which the grooves on opposite sides of said assemblage are coincident with one another.

9. A method of making a honeycomb structure comprising the steps of:

providing a plurality of sheets or strips of flexible material, superimposing said sheets or strips in stacked orientation wherein the adjacent surfaces of said sheets or strips are in juxtaposition to one another;

securing said sheets or strips to one another at alternate locations to form an assemblage that defines a honeycomb structure when said assemblage is expanded, the assemblage having top and bottom surfaces and opposite longitudinal sides;

cutting flange tabs into at least one of said longitudinal sides, such that said flange tabs are not coincident with any said alternate locations of securement;

expanding said assemblage to define a honeycomb structure, and bending said flange tabs substantially right-angularly to said honeycomb structure to provide flanges on at least one longitudinal side thereof.

10. The method of claim 9 in which said cutting is accomplished by grooving at least one longitudinal side of said assemblage to define the shape of said flange tabs.

11. An assemblage of metallic foil sheets expansible into a honeycomb structure comprising the combination of:

a plurality of said sheets in stacked orientation wherein the adjacent surfaces of said sheets are in juxtaposition to one another;

weldments securing said sheets to one another, said weldments being spaced to define honeycomb core cells when said assemblage is expanded, said assemblage having top and bottom surfaces and opposite longitudinal sides; and flange tabs formed in at least one of said longitudinal sides only at locations other than said weldments.

12. The assemblage of claim 11 in which said tabs are defined by series of grooves in said at least one of said longitudinal sides.

13. The assemblage of claim 12 in which said grooves are formed on both opposite longitudinal sides and said grooves on said opposite sides are aligned with one another.

14. The assemblage of claim 13 in which alternate grooves are coincident with said weldments.

15. The assemblage of claim 11 in which said flange tabs are defined by of grooves in said opposite longitudinal sides and said grooves define the spacing and configurations of said flange tabs.

16. The assemblage of claim 11 expanded to define a honeycomb configuration and in which said flange tabs extend laterally from said opposite longitudinal sides of said honeycomb core configuration.

17. The assemblage of claim 16 in which said flange tabs are bent into right angular orientation with said honeycomb core configuration.

18. A method of fabricating a metallic foil honeycomb structure comprising the steps of:

stacking a plurality of sheets of foil in contiguous relationship with one another;

welding said sheets to one another to form an assemblage that defines a honeycomb configuration when said assemblage is expanded;

forming flange tabs on at least one longitudinal side of said assemblage, said flange tabs being formed only at locations other than the locations of said welding;

expanding said assemblage to provide a honeycomb structure; and bending said flange tabs substantially right-angularly to said honeycomb structure to provide flanges on said at least one longitudinal side thereof.

19. The method of claim 18 including the step of grooving the opposite longitudinal sides of said assemblage to define said flange tabs.

20. The method of claim 19 in which said grooves are located coincident with alternate weldments.

* * * * *